United States Patent [19]
Jackson et al.

[11] Patent Number: 5,632,501
[45] Date of Patent: May 27, 1997

[54] SELF-LATCHING TRAILER COUPLER

[75] Inventors: Michael L. Jackson, Evanston, Wyo.; Jared B. Larson, Logan, Utah; Joseph L. Whiteley, Oakley, Id.

[73] Assignee: Atwood Industries, Inc., Rockford, Ill.

[21] Appl. No.: 489,386

[22] Filed: Jun. 12, 1995

[51] Int. Cl.⁶ ................................................. B60D 1/06
[52] U.S. Cl. .......................... 280/508; 280/511; 280/512
[58] Field of Search ....................................... 280/506, 508, 280/509, 510, 511, 512, 513, 477

[56] References Cited

U.S. PATENT DOCUMENTS

| | | | |
|---|---|---|---|
| 2,061,234 | 11/1936 | Hoflich | 280/512 |
| 2,744,767 | 5/1956 | Kleiman | 280/512 |
| 4,209,184 | 6/1980 | Byers | 280/508 |
| 4,545,596 | 10/1985 | Luke et al. | 280/508 |

FOREIGN PATENT DOCUMENTS

| | | | |
|---|---|---|---|
| 0617219 | 3/1961 | Canada | 280/508 |
| 2420441 | 11/1979 | France | 280/512 |
| 2628061 | 1/1977 | Germany | 280/512 |

*Primary Examiner*—Anne Marie Boehler
*Attorney, Agent, or Firm*—Leydig, Voit & Mayer Ltd.

[57] ABSTRACT

A self-latching trailer coupler for use with a ballhead coupling post is disclosed. The coupler includes a housing having a forward portion that forms a receiving socket, and a rear portion. A latching member is disposed within the rear portion of the housing and is adapted for movement between a latched and a released position, the movement of the latch member being controllably guided along a complex path by guide pins and guide slots. The latching member has a socket which engages the ballhead when the coupler is positioned over a ballhead. Downward force on the coupler, as would be due to the load on the tongue of a trailer, automatically translates and rotates the latch member to a fully engaged locked position. A self-actuating locking device is provided for locking the latching member in its latched position. In connection with the locking device, a lever for releasing the locking device is also provided.

13 Claims, 2 Drawing Sheets

SELF-LATCHING TRAILER COUPLER

BACKGROUND OF THE INVENTION

1. Field of the Art

The present invention relates to couplers for hitching trailing vehicles to towing vehicles, and more particularly, to latching mechanisms for securely latching couplers of trailing vehicles to a spherical ballhead of a towing vehicle.

2. Discussion of the Related Art

The ballhead coupler is a common type of coupling mechanism used to hitch a wide variety of trailers to towing vehicles—e.g., boat trailers, RV trailers, flat-bed trailers, cargo trailers, etc. The ballhead coupler is characterized by a coupling post having a spherical ballhead securely mounted to the rear bumper or frame of a towing vehicle. The mating coupler, provided on the nose or tongue of a trailer, has a corresponding downwardly opening socket that receives and captures the ballhead to achieve a pivotal connection therewith.

The ballhead coupler just described is popular, in part, because it offers tremendous performance advantages over other types of trailer couplers. Most notably, the spherical shape of the coupling allows both side-to-side and up-down pivotal movement between the trailer and towing vehicle, as encountered during turns or travel over bumps, with virtually no torque translated through the coupler to the towing vehicle. As a result, a smoother ride and greater vehicle steering control are achieved.

In order to facilitate attachment of the trailer to the coupling post, the mouth of the downwardly opening receiving socket must be larger than the diameter of the ballhead. This allows the coupler to be readily lowered onto the ballhead. Without more, however, the trailer would tend to uncouple when traveling over bumps or rough roads. Therefore, some type of retaining mechanism is needed to lock the coupler with the ballhead secured within the socket of the coupler. It is appreciated, however, that the retaining mechanism must be designed to allow pivotal movement between the receiving socket and the coupling post and, thus, preserve the low torque connection between the trailer and towing vehicle.

Typically, a ball clamp of some type is provided to latch or captively engage the ballhead within the receiving socket of the trailer coupler, and yet maintain the pivotal connection therebetween. For example, U.S. Pat. No. 4,763,917 to Chambers, shows a lever-latch 30 that is manually operated to engage a ball clamp against the lower portion of the ballhead and, thus, retain the ballhead in the receiving socket. Using a coupler such as that illustrated in the Chambers patent requires a conventional two-step operation in which a first step seats the ball within the socket, and a second subsequent step engages a latching mechanism to latch the seated ball in the socket.

Manual intervention is needed to couple or uncouple the trailer, and the Chambers patent is illustrative of the general approach of requiring the operator to physically actuate a form of latching or locking mechanism after the coupler engages the ball to prevent inadvertent or unwanted uncoupling. Applicants are unaware of any reliable coupler design which eliminates the need for the operator to physically lock the coupler in the latched position.

Two common problems arise from the use of manually operated latching mechanisms which require the operator to lock the mechanism after engaging the coupler with the ballhead. First, operators are known to occasionally forget to engage the locking mechanism. Unfortunately, this oversight is often not noticed until the vehicle and trailer reach a relatively high road speed, and the trailer uncouples. The reason for this is that trailers are typically designed, by the placement of the axle, for balance so that the wheels support the substantial weight of the trailer and the coupler or tongue supports a relatively small portion of the trailer weight. Nevertheless, this relatively small weight at the coupler is usually sufficient to maintain the coupling when traveling at low speeds. At higher speeds, however, even small bumps can cause the trailer to uncouple, having potentially disastrous consequences.

A second problem with manually operated latching mechanisms is that they are often improperly latched. It is important that the receiving socket of the trailer coupler be fully seated over the ballhead before engaging the ball clamp. It is known, however, that occasionally operators—particularly persons that infrequently use and couple trailers—mistakenly engage the manual latch before the receiving socket is fully seated over the ballhead. This is sometimes referred to as false coupling, and the repercussions are the same as if the latching mechanism had not been engaged at all.

SUMMARY OF THE INVENTION

Accordingly, it is a primary aim of the present invention to provide a self-latching trailer coupler.

Another object of the present invention is to provide a trailer coupling mechanism that assures that the ball is fully seated in the jacket, thereupon it automatically engages a locking mechanism.

A further object of the invention is to reduce the possibility of false coupling by automatically latching if the coupler is properly placed over the ball, or by providing an unstable support for the coupler on the ball if not properly seated.

According to one aspect of the invention, it is an object to provide a coupler in which the ballhead cooperates with a latch member in the coupler to carry the latch member to the locked position as the ball reaches the seated position in the socket, thereby to eliminate the need for secondary manually operated latching mechanisms.

Yet another object of the present invention is to provide a trailer coupling mechanism that will signal to the operator that the coupler has been properly seated and latched.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a self-latching coupler for hitching a trailing vehicle to a ballhead of a towing vehicle. The coupler includes a housing having a ball-receiving socket at the forward end. A latching member carried in the housing has a forward portion configured to complete the socket and a portion to the rear of the forward portion configured to lock the latching member. The latching member is mounted in the housing so that it has two positions: (1) a released position in which the forward portion of the latching member is disposed to open the socket and allow entry of a ballhead, and (2) a latched position in which the forward portion of the latching member partly underlies an inserted ballhead to capture the ballhead within the socket. The forward portion of the latching member is disposed in the release position to engage the ballhead and be carried to the latched position by the ballhead as it progressively enters the socket. Lock means, having a manual release, are provided for locking the latching member in the latched position.

In the preferred embodiment, mounting of the latching member is accomplished by guide means which define a complex path for controllably directing the transition of the latching member between the released and latched positions. Particularly when moving from the released to the latched positions, the guide means guides the latching member, while the ballhead itself provides the force which moves the latching member from the released to the latched position.

In the preferred form of the invention, the forward portion of the latching member is curved. The curve will be cylindrical or spherical. The latching member is configured as a latching block having two pinned connections to the housing, one of the connections providing for translation of the curved surface in the latching member toward or away from the ballhead, and the second providing for arcuate movement so that the curved surface of the latching member rotates about the ballhead as the ballhead is inserted into the socket. Other objects and advantages will become apparent from the following detailed description when taken in conjunction with the drawings, in which:

DETAILED DESCRIPTION OF THE PREFERRED EMBODIMENTS

Figure 1:
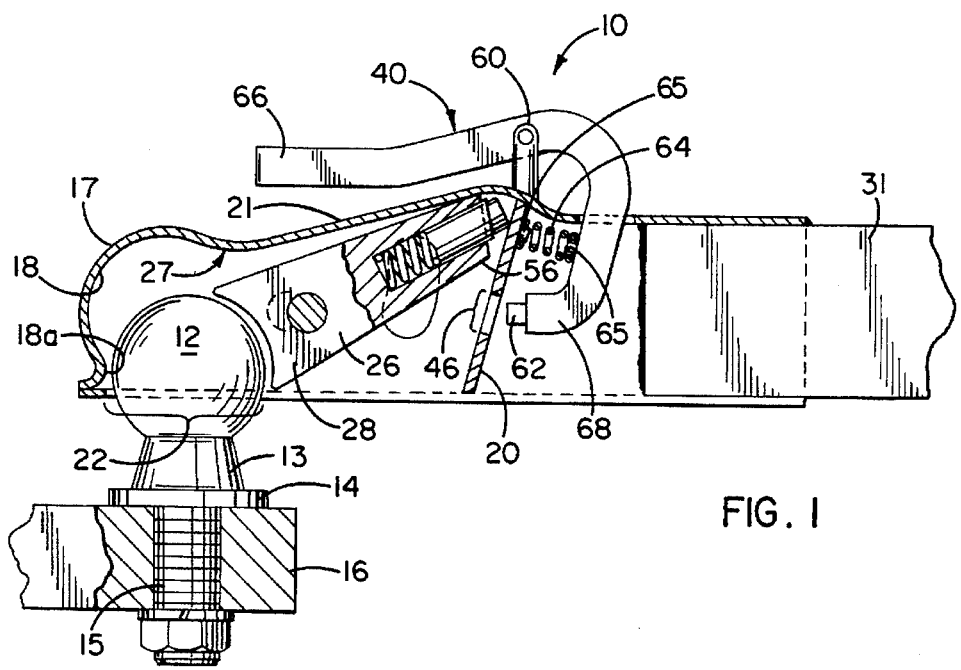
FIG. 1 is a side view, partially in cross-section, showing a coupling mechanism exemplifying the present invention, associated with a ballhead coupling post prior to latching the ballhead into the coupler.

For purposes of illustration, the invention is shown in the drawings as embodied in a coupler 10 for hitching the front tongue 31 of a trailing vehicle to a spherical ballhead 12 on the rear of a towing vehicle. Referring now to FIG. 1, a ballhead-type trailer coupler is shown, and generally designated by reference numeral 10. The coupler is associated with a ballhead coupling post having a ballhead 12 typically including a neck 13 and shoulder portion 14, stationarily mounted as by bolt 15, to a mounting base 16. Typically, the base 16 is a flange formed on the rear bumper of the towing vehicle. For heavy towing loads, however, the mounting base 16 may be attached to the frame of the towing vehicle.

The coupler 10 is affixed to the tongue 31 of the trailer and includes a housing 27 made of heavy sheet metal. The housing has a forward portion that defines a socket 17 for receiving the ballhead 12, and a rear portion adapted to be secured to the tongue 31 of the trailer. The receiving socket 17 has a hemispherically-shaped interior surface 18 that opens downwardly to define a mouth 22 that receives the ballhead 12. Accordingly, as the trailer coupler 10 is lowered over the coupling post, the ballhead 12 is received through the mouth 22 and into the receiving socket 17. In this regard, it is appreciated that the hemispherically-shaped interior surface 18 closely conforms to the outer surface of the ballhead 12.

In addition to the forward portion of the housing 27 defining the socket 17, the housing body is of inverted U-shaped cross-section having two transversely spaced side walls 19 whose upper margins are integral with an inclined top wall 21. The top wall slopes upwardly from the ball socket toward a backplate 20. The backplate 20, also of heavy sheet metal, is securely fixed within the channel as by welding. A generally horizontal section of the channel, to the rear of the backplate, is available to receive and secure the tongue 31 of the vehicle to be towed.

Figure 2:
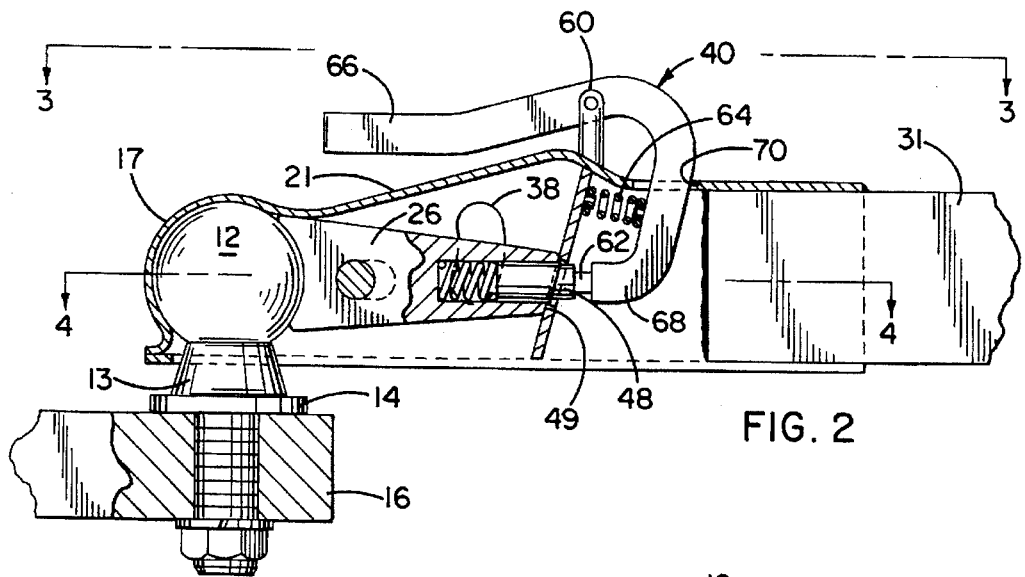
FIG. 2 is a similar side view, partially in cross-section, showing the coupling mechanism of FIG. 1, in the latched position.
Figure 5:
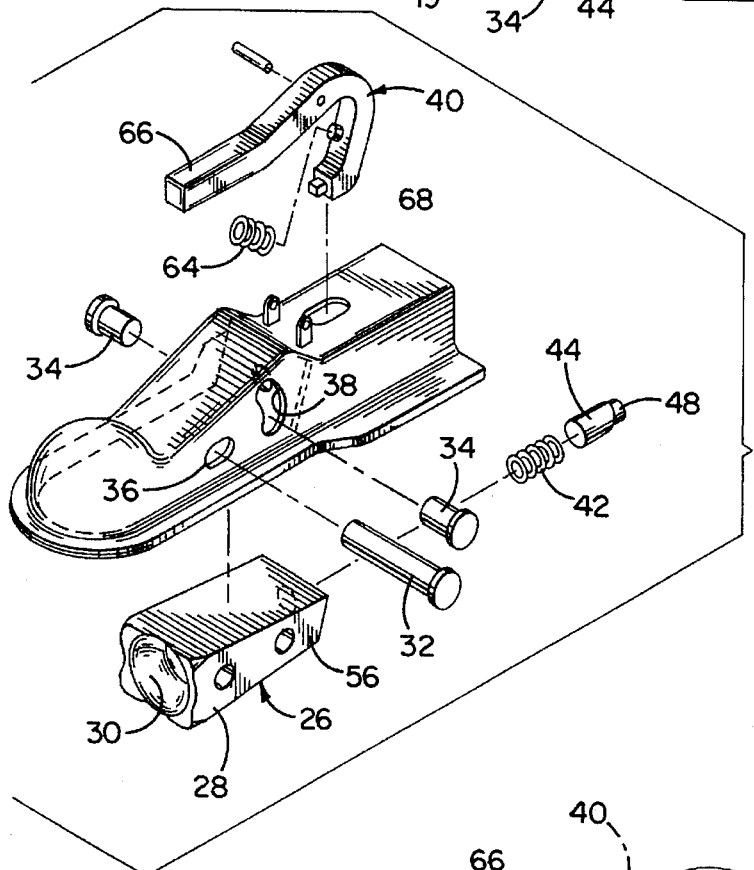
FIG. 5 is an exploded perspective view of a coupling mechanism exemplifying the present invention.

In practicing the invention, a latching member 26 is positioned in the housing to the rear of the socket and is adapted to cooperate with a ballhead for translation between an unlatched condition shown in FIG. 1 and a latched condition shown in FIG. 2, wherein the ballhead itself carries the latching member between those positions. In the preferred embodiment, best illustrated in the exploded view of FIG. 5, the latching member 26 is a tapered metal block having a front end 28 configured to complete the socket 17. In the illustrated embodiment, the front end 28 is contoured to form a socket 30 dimensioned to closely conform to the outer contour of the ballhead 12. A horizontally disposed cylindrical surface would also function in place of the spherical surface, as will become apparent as this description progresses. Guide means, shown herein as symmetrically disposed guide pins 32 and 34 project from each side of latch 26 and through guide slots 36 and 38 in side-walls 19. As will be described in more detail below, latching member 26 is disposed in the rear portion of housing 27 and is adapted for movement between a latched position (FIG. 2) and an unlatched position (FIG. 1). Movement between the unlatched (FIG. 1) and latched (FIG. 2) position requires no manual manipulation of the latching member. The operator need only position the coupler over the ballhead and allow or assist it to seat. However, movement from the latched (FIG. 2) to the unlatched (FIG. 1) position does require manual intervention to release the latch.

Figure 3:
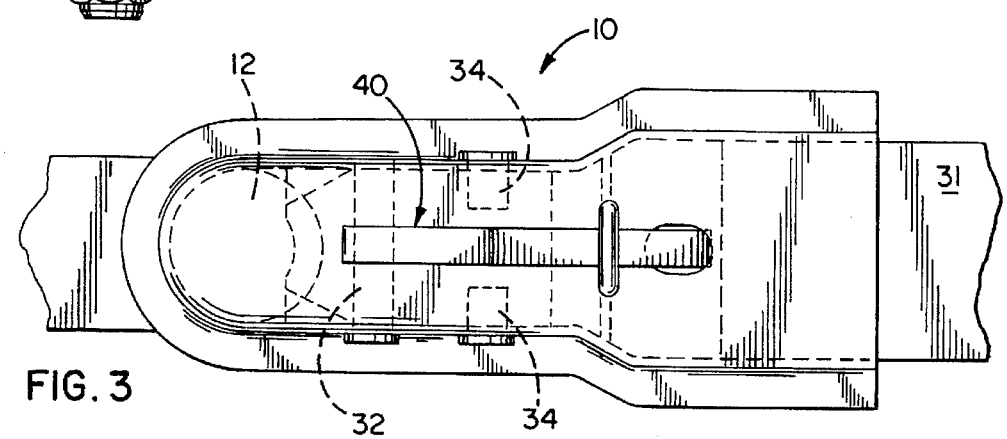
FIG. 3 is a plan view taken along the line 3—3 of FIG. 2 showing the coupler in the latched position.
Figure 4:
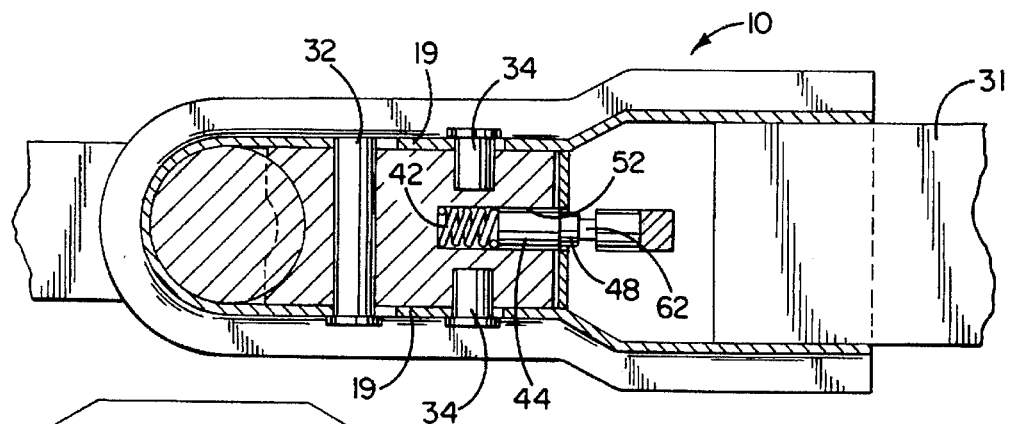
FIG. 4 is a sectional view taken along the line 4—4 of FIG. 2 with the coupler in the latched position.

In the presently preferred embodiment, and as illustrated in FIGS. 3 and 4, guide pin 32 extends completely through latching block 26. Due to the placement of a locking means (described below), however, guide pins 34 are symmetrically disposed on opposing sides of latching block 26, and extend only part way into the block body. Of course, the configuration could be readily adapted so both guide pins 32 and 34 would extend completely through the body of member 26. As will be appreciated from the discussion that follows, guide pins 32 and 34 cooperate with slots in housing 27 to define a path of movement for latching member 26 within guide slots formed in the housing. Other forms of guide means will also become apparent capable of achieving the controlled motion of the latching block described herein.

Guide slot 36 is a substantially horizontally disposed slot, while guide slot 38 is a substantially vertically, and arcuately-shaped slot. It is important that the arc of the slot 46 not be centered on the ballhead 12 when the coupler is in the latched position. With the horizontally disposed slot 28 allowing translation of the latch member toward or away from the ballhead, it is useful to provide a center for the arcuate slot 38 which is above the ballhead in the latched condition, so that the latching member rotates about the ballhead and also translates toward the ballhead to achieve the latched condition.

As illustrated in FIG. 1, when latching member 26 is in the unlatched or released position, guide pin 32 is positioned in the rear of guide slot 36, and guide pin 34 is positioned at the top of guide slot 38. Conversely, when member 26 is in the latched position, guide pin 32 is positioned in the front of guide slot 36, and guide pin 34 is positioned at the bottom of guide slot 38.

Guide slots 36 and 38, as illustrated, in cooperation with guide pins 32 and 34 form a guide means that provides a controlled path for movement of latching member 26. Indeed, cooperation between the guide pins 32 and 34 and guide slots 36 and 38, respectively, effectively guide latching member 26 through its transition between latched and released positions. It is understood that arcuately-shaped guide slot 38 provides a rotational component to the movement of latching member 26 about the receiving socket 17, while linearly-shaped guide slot 36 provides a linear component of movement. Thus, guide slots 36 and 38 cooperate with guide pins 32 and 34 to define a complex translational path for latching member 26. Consistent with the concepts and teachings of the present invention, however, it should be appreciated that the controlled movement of member 26 provided by the guide means may be implemented by a wide variety of structural variations or adaptations to the guide pin/guide slot combination disclosed herein. For example, the particular locations of guide pins 32 and 34 could be changed, and the shape or location of guide slots 36 and 38 could be altered, and yet effect a controlled translation of member 26 between latched and released positions.

Also forming a part of the present invention is a self-actuating locking means that serves to lock the member 26 in its latched position until released by manual manipulation of a release lever 40. In the practice of the invention, the locking member has two significant functions. First of all, when the latch member is carried by a ballhead to the latched position, the locking means automatically engages to lock the latching member in the secured and closed position, and without the requirement for any intervention by an operator. With respect to the second function, the locking means cooperates with a manual release mechanism for releasing the latching member and allowing the coupler to be withdrawn from the ballhead, for the purpose of uncoupling the trailer. As a subsidiary feature, a characteristic audible sound created by the locking means falling into its locked position can signal the operator that the coupler is indeed securely locked.

In the illustrated embodiment, the locking means is shown as a simple spring-loaded plunger secured in the rear end of the latching member 26 and cooperating with a locking aperture 46 formed in the backplate 20. The pin plunger mechanism includes a spring 42 and plunger 44 fit within a bore 52 of the latch member 26. The plunger 44 has a reduced diameter section 48 for engagement with the aperture 46 in the backplate. Preferably, a locking plate (not shown) is affixed to the rear of the latch member to prevent the spring 42 from forcing the plunger 44 out of the housing beyond the position illustrated in FIG. 2. The plunger 44 is preferably an elongate steel rod closely conforming to the bore 52 formed in the rear of the latching member 26 so that it will reliably resist any torsional unlocking loads imposed on the pin when in the locked condition during the use of the coupler.

When latching member 26 is in its released position (FIG. 1), compression spring 42 biases locking plunger 44 outwardly to engage the face of backplate 20. When member 26 is motivated into its latched position, locking plunger 44 is carried along the backplate 20 and forced into socket 52 until the plunger aligns with aperture 46. Compression spring 42 then urges the end 48 of reduced diameter through anchor hole 46, thereby latching member 26 in place. Preferably, the tension of compression spring 42 is sufficient to briskly snap end 48 through hole 46, and thereby produce an audible sound of steel striking steel, loud enough for an operator to hear. Advantageously, this audible snap informs the operator that the trailer coupler 10 has been fully seated over ballhead 12 and the latching mechanism properly engaged. It will also be noted that when in the locked condition the rear surface 49 of the latch member has an angle which matches the angle of backplate 20. The angle of backplate 20 is adapted to carry the latch member forward (so that the pin 32 engages the forward end of slots 36). In that position, the angled rear face 49 of the latch member lies against the backplate 20 so that any rearward forces imposed on the latch member 26 by the ball 12 during operation of the vehicle are transmitted directly to the backplate. As a result, the backplate and not the latch mechanism or side pins absorbs these forces during operation of the vehicle.

It should be appreciated that, consistent with the broader aspects of the present invention, the locking means described above may employ a number of structural variations. Indeed, persons skilled in the art will now realize that the present invention may be practiced with wide variety of modifications or adaptations to the foregoing locking means. For example, the rear end of latching member 26 may rest against a hinged backplate which is spring loaded toward the latch to automatically lock it in the latched position, and allow for manual release for uncoupling.

In keeping with the description of the preferred embodiment, once member 26 is latched securely in place, it will remain latched until the locking means is manually disengaged. This function is performed by a releasing means, which is illustrated as a release lever 40. More particularly, a J-shaped release lever 40 is pivotally hinged at 60 so as to provide a handle 66 for manual manipulation, and a second end 68 aligned with locking aperture 46 of backplate 20. As illustrated, it is preferred to provide a release button 62 of reduced diameter on the second end 68 of the release lever 40; the diameter of release button 62 is small enough to project through anchor hole 46. Advantageously, the shoulder formed between release button 62 and the body of release lever 40 provides a stop for release lever 40, once release button 62 has projected far enough through anchor hole 46 to fully disengage locking plunger 44. In addition, the body of release lever 40 is designed to allow a substantial load-bearing force to be applied to the handle end 66 of lever 40. As will be appreciated by one practicing the invention, the lever 40 may be used, not only to disengage the locking plunger 44, but also to lift the trailer coupler from the ballhead 12. Accordingly, it is desired to design the release lever 40 to withstand such externally applied force.

Figure 6:
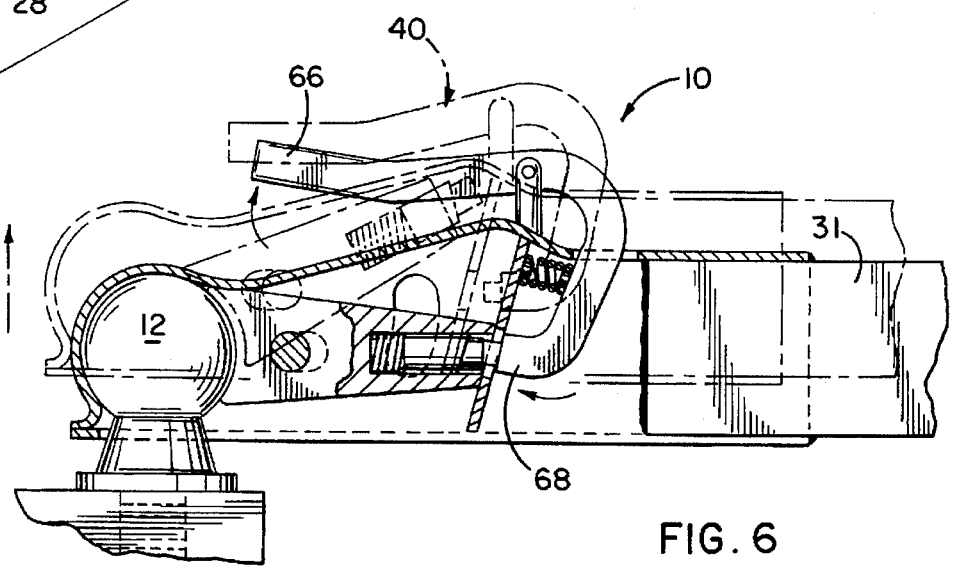
FIG. 6 is cross-sectional side view similar to FIGS. 1 and 2 illustrating the manual release mechanism.

Normally, when no external force is applied to release lever 40, a compression spring 64 applies a force to lever 40 that biases the lever into a normal, rest condition in which release button 62 allows locking plunger 44 to protrude through aperture 46. The compression spring 64 is preferably held in place by means such as protrusions 65 formed on the lever 40 and the backplate 20. As illustrated, the release lever 40 abuts the housing of the coupler at 70, which serves as a stop for the lever 40. As illustrated in FIG. 6, an upwardly directed external force applied to the handle 66 of lever 40 acts to release latching member 26 from its locked position, by forcing the reduced end 48 of locking plunger 44 back through anchor hole 46. In this regard, the externally applied pressure translates, in part, to release button 62, which fully disengages locking plunger 44. Continued force applied upwardly at the first end 66 of lever 40 or otherwise applied to the trailer tongue 31, serves to lift the coupler from ballhead 12.

Having described the structural elements of the preferred embodiment of the present invention, a brief description of its operation will now be presented. When first applying the coupler 10 to a ballhead coupling post, as shown in FIG. 1, the latching member 26 is in its released position. It can be appreciated that the second or rear end 56 of member 26, when no forces are applied, will tend to rest against the ceiling 21 of housing 27. This is due to the rearward slope of the backplate 20 which carries the rear end 56 of the latch member upwardly as the coupler is withdrawn from the ballhead, and the pin plunger 44, biased by the spring 42, which engages the sloped surface of backplate 20 to hold the latch member in the topmost unlatched condition.

As the ballhead 12 is received through the mouth 22 of housing 27, it first contacts the upper lip of the front end 28 of latching member 26, applying an upwardly directed force thereto. Controlled by the guiding means of the guide pins 32 and 34 and guide slots 36 and 38, the upward force applied by the ballhead 12 to the front end 28 of member 26 results in a downward force to the rear end 56 of member 26. The weight of the trailer applies a sufficient force to member 26 to overcome the counter-acting force resulting from the slope of backplate 20, and as a result the member 26 begins to translate from the position illustrated in FIG. 1 toward the position illustrated in FIG. 2.

Continued insertion of ballhead 12 into housing 27 carries latching member 26 through a further translation toward the position of FIG. 2. In effect, the curved portion 30 of the latching member 26 rotates about the ballhead as the ballhead is inserted into the socket. As the guide pin 34 in the arcuate slot causes rotation of the pin 34 about the center of the slot, the guide pin 36 in the linear slot translates forwardly, bringing the ballhead 12 over a shoulder 18a into the socket 18. The ball 12 is ultimately moved forward to conform with the socket 18 at the same time as the latch member 26 moves with the pin 34 to the bottom of its arc and the pin 36 to the front of its slot, to create a ballhead socket which conforms to the size of the spherical ballhead 12, and locks the ballhead well below its center so that it cannot be unintentionally released from the coupler.

It is significant to note that the ballhead 12 is the element which engages the socket 30 in the latching member to carry the latching member from its unlatched to its latched position. If the coupler is not fully engaged before the tongue 31 is lifted, the latch member 26 will not translate to the locked position, because it is the ballhead 12 which must cause that translation. The only way the latching member 26 can reach the locked condition is if the ballhead 26 engages the socket and carries the latch member 26 through its full range of translation to the locked condition.

As ballhead 12 becomes fully seated in socket 17, locking plunger 44 aligns with aperture 46. At this point, compression spring 42 forces the reduced end 48 of locking plunger 44 through aperture 46, thereby locking the latching member 26 in place and at the same time generating an audible snap which alerts the operator that the coupler is properly installed. In this position, it is appreciated that the ballhead 12 is effectively captured, by the combination of socket 17 and latch member 26.

It is also significant to note that the mouth 22 through which the ballhead projects upon entry into the coupler provides only a limited area of contact for the ballhead with the socket. Thus, as will be appreciated from FIG. 1, it is not possible for the ballhead to engage the lowermost portion of the latch member 26 and force it to the locked position. The ballhead will either slide forwardly into the socket or rearwardly, but in either event will not couple. When the ballhead 12 moves forwardly into the socket, the forces exerted between the ballhead 12 and the coupler, due to the position of the socket and manner in which the travel path of the latching member 26 is controlled, causes the ball in the socket to carry the latch member to the locked condition. The possibility of a partly latched ball is effectively eliminated. The possibility of a ballhead 12 being associated with the coupler without latching is also substantially reduced due to the fact that the weight of the trailer will bring the coupler to the latched condition in almost all instances, and the very shallow portion of the socket below the latching shoulder 18a makes it abundantly clear if the coupler is loosely riding atop a ballhead without reaching the latched condition. Thus, even if tampering, for example, results in inadvertent latching of the latch, when an attempt is made to couple to a ballhead without unlatching, the ball will underlie the latched coupler but in a very unstable condition. False coupling will likely be immediately apparent visually, or the coupler will slide off the ball if the towing vehicle begins to move.

Release of the latching member 26 is achieved by applying an upwardly directed force to the handle 66 of release lever 40. It is contemplated that an operator will grip this portion of the release lever and lift. This lift will compress spring 64, allowing release button 62 to unlock member 26 by forcing the reduced end 48 of locking plunger 44 back through the locking aperture 46 of backplate 20. Continued lift will apply a downward force from the ballhead 12 to the lower lip of the socket 30 of the latching member front end 28, which, as directed by the guide pins 32 and 34 and guide slots 36 and 38, causes a corresponding upward force on the rear end 56 of member 26. Accordingly, the member translates from its latched position illustrated in FIG. 2 to its released position illustrated in FIG. 1, allowing the ballhead 12 to exit the mouth 22 of the coupler.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A self-latching coupler for hitching a trailing vehicle to a ballhead of a towing vehicle comprising, in combination:

a housing having a forward portion that forms a socket to receive the ballhead, a rear portion of the housing being configured for attachment to a tongue of the trailing vehicle;

a latching member carried in the housing and located to the rear of the socket;

the latching member having a forward end shaped to receive the ballhead when inserted into the housing socket, the latching member also having a rear portion configured to cooperate with the housing to lock the latching member in place;

guide means for mounting the latching member in the housing and providing respective released and latched positions for the latching member;

the latching member in the released position being positioned with the shaped forward end disposed to open the socket and allow insertion of a ballhead, and in the latched position being positioned with the shaped forward end captively engaging the ballhead in the socket;

means for locking the latching member in the latched position, the means being self-actuating upon translation of the latching member to the latched position, the locking means further including a plunger attached to the latching member;

the guide means being arranged so that, with the latching member in the released position, a ballhead inserted into the socket translates the latching member to its latched position, and thereby actuating the locking means;

wherein the housing includes a locking aperture that cooperates with the locking plunger to lock the latching member in place, when the latching member is in the latched position.

2. A self-latching coupler for hitching a trailing vehicle to a ballhead of a towing vehicle comprising, in combination:

a housing having a forward portion that forms a socket to receive the ballhead, a rear portion of the housing being configured for attachment to a tongue of the trailing vehicle;

a latching member carried in the housing and located to the rear of the socket;

the latching member having a forward end shaped to receive the ballhead when inserted into the housing socket, the latching member also having a rear portion configured to cooperate with the housing to lock the latching member in place;

guide means for mounting the latching member in the housing and providing respective released and latched positions for the latching member;

the latching member in the released position being positioned with the shaped forward end disposed to open the socket and allow insertion of a ballhead, and in the latched position being positioned with the shaped forward end captively engaging the ballhead in the socket;

means for locking the latching member in the latched position, the means being self-actuating upon translation of the latching member to the latched position, the locking means further including a plunger attached to the latching member;

the guide means being arranged so that, with the latching member in the released position, a ballhead inserted into the socket translates the latching member to its latched position, and thereby actuating the locking means; and release means including a handle engageable for manual manipulation and having an operative end positioned to engage the locking plunger upon manual manipulation of the handle thereby to release the latching member from the latched position and allow withdrawal of the ballhead from the socket.

3. A self-latching coupler for hitching a trailing vehicle to a ballhead of a towing vehicle comprising, in combination:

a housing having a forward portion that forms a socket to receive the ballhead, a rear portion of the housing being configured for attachment to a tongue of the trailing vehicle;

a latching member carried in the housing and located to the rear of the socket;

the latching member having a forward end shaped to receive the ballhead when inserted into the housing socket, the latching member also having a rear portion configured to cooperate with the housing to lock the latching member in place;

guide means for mounting the latching member in the housing and providing respective released and latched positions for the latching member;

the latching member in the released position being positioned with the shaped forward end disposed to open the socket and allow insertion of a ballhead, and in the latched position being positioned with the shaped forward end captively engaging the ballhead in the socket;

means for locking the latching member in the latched position, the means being self-actuating upon translation of the latching member to the latched position, wherein the housing includes a backplate opposite the receiving socket and cooperating with the locking means; and the guide means being arranged so that, with the latching member in the released position, a ballhead inserted into the socket translates the latching member to its latched position, and thereby actuating the locking means.

4. The coupler according to claim 3 in which the guide means comprises two sets of connections interconnecting the latching means and the housing, one set of the connections being positioned to cause the ball-receiving portion of the latching member to rotate about the socket, the other set of connections being positioned to cause the latching member to translate toward or away from the socket.

5. The coupler according to claim 4 in which the two sets of connections comprise pinned connections.

6. The coupler according to claim 5, wherein the two sets of connections include two sets of guide pins and two sets of aligning guide slots symmetrically disposed in each of two opposing sides of the latching member and housing.

7. The coupler according to claim 6, wherein one set of the guide slots is arcuately-shaped to provide a rotational component of movement to the latching member about the receiving socket.

8. The coupler according to claim 7, wherein one set of the guide slots is arranged to provide a substantially linear component of movement to the latching member.

9. The coupler according to claim 3 in which the locking means includes a locking plunger attached to the latching member, the locking plunger being positioned to cooperate with the backplate, the backplate having a locking aperture, and the plunger positioned to engage the locking aperture when the latching member is in the latched position.

10. The coupler according to claim 9, wherein the locking plunger further includes spring means for projecting the plunger through the locking aperture.

11. The coupler according to claim 9 further including release means having a manually manipulatable handle and an actuator, the actuator being positioned adjacent the locking aperture so that manual manipulation of the handle releases the plunger to allow the coupler to be lifted from the ballhead, lifting of the coupler serving to return the latching member to the released position.

12. The coupler according to claim 11, wherein the releasing means includes a lever pivotally mounted on the housing with the operative portion aligned with the locking aperture.

13. The coupler according to claim 3, wherein the first end of the latching member includes a curved surface that closely conforms to the exterior contour of the ballhead when the ballhead is received by the receiving socket.

* * * * *